Feb. 21, 1933.   M. PONGILUPPI   1,898,142

RESILIENT WHEEL

Filed April 11, 1930

Inventor:
Mario Pongiluppi
By
Attorney.

Patented Feb. 21, 1933

1,898,142

UNITED STATES PATENT OFFICE

MARIO PONGILUPPI, OF SERRAVALLE PO, MANTUA, ITALY

RESILIENT WHEEL

Application filed April 11, 1930, Serial No. 443,465, and in Italy April 19, 1929.

The present invention relates to vehicle resilient wheels and it has for its object a wheel which is made resilient by means of an air tube supporting a road-contacting cover by freely floating intermediate members.

Figure 1:
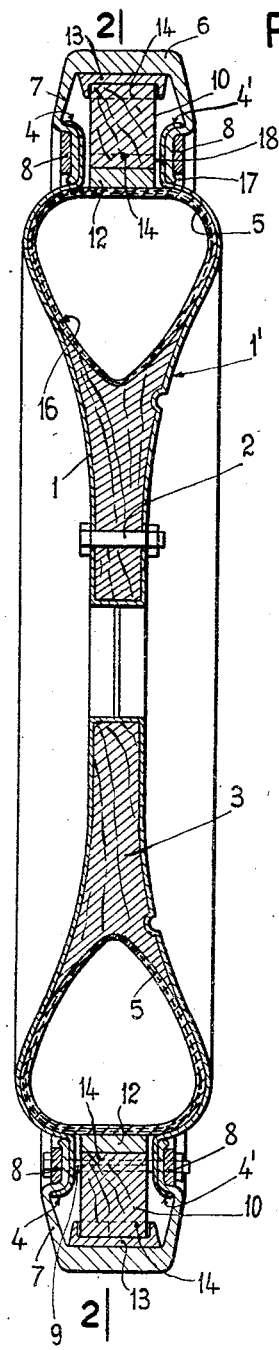
Figure 2:
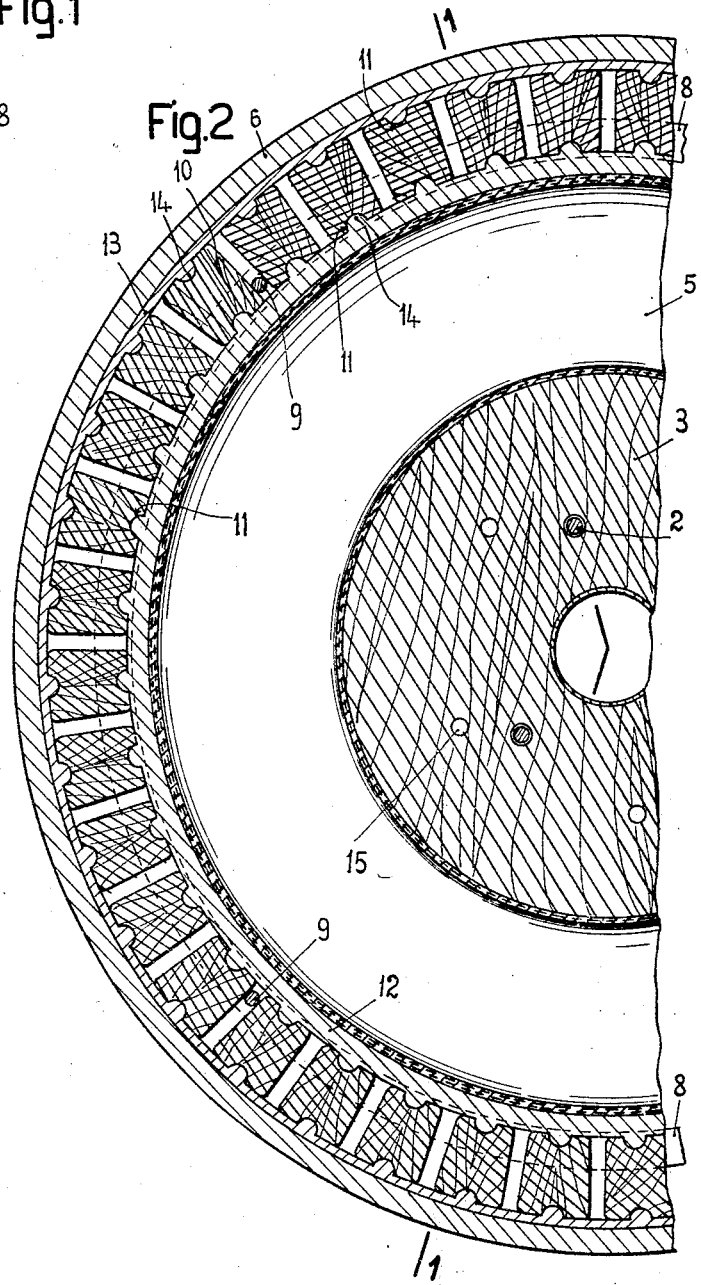

On the annexed drawing is shown by way of examples an embodiment of the present invention, and Figure 1 is a section of the same on line 1—1 of Figure 2, and Figure 2 is a section on line 2—2 of Figure 1.

As shown in the drawing, the wheel comprises two sheet metal disks 1, 1' interconnected by means of bolts 2 and having usual holes 15 for mounting the wheel on the axle hub.

Said disks 1, 1' may have any desired configuration, it being only essential that they provide a peripheral annular space 16 which is confined by a central filling member 3, say of wood, which is engaged by said bolts 2 intermediate disks 1, 1'.

Said disks 1, 1' when interconnected with each other and with intermediate filling member 3, have their peripheral edges spaced from each other and they are provided each with a radial flange 4, 4' providing the sides of a channel 18 opening into the annular space 16 provided by disks 1 and 1' at the periphery of the wheel body.

An air tube 5 is located in said space 16 and a sectional spacing rim is located intermediate flanges 4, 4' said rim consisting of shoes 10 encircled by a road contacting tread 6 which in the illustrated construction is embodied in a cover 7. Said cover 7 is engaged over channel flanges 4, 4' by means of inturned beads 17 and rings 8 fastened in position by means of bolts 9 extending through holes in beads 17 and flanges 4, 4'.

Cover 7 may have any suitable shape and be provided in any suitable manner adapted to fasten tread 6 in position on the periphery of the wheel body provided by disks 1, 1'.

In any case tread 6 must bear on the portion of air tube 5 lying intermediate flanges 4, 4' by means of a sectional rib floating intermediate said flanges 4, 4' without being in contact therewith under normal conditions of operation. In the illustrated embodiment said rim consists of a series of shoes 10 having a width shorter than the free distance intermediate flanges 4, 4'; said shoes may be of wood, light metal or any suitable material. Conveniently said shoes are held in defined position with respect to each other; such interengagement of the shoes 10 may be secured by providing them with engaging means on their inner and outer faces; said means may comprise, as illustrated, transverse depressions 11 in shoes 10 and transverse ribs on bands 12 and 13 located respectively on air tube 5 and within cover 7, said transverse ribs 14 adapted to engage recesses 11 of shoes 10 (see Figure 2).

The row of shoes 10 and bands 12 and 13, which may be made of rubber, fabric, leather or any other suitable material, provide in their whole a deformable rim by means of which the tread 6 is supported by air tube 5 and receives from the latter an outward pressure resiliently holding it in normal configuration.

In operation cover tread 6 is enabled to become deformed by effect of unevennesses of road surface, and deformations of said rim are resiliently received and absorbed by air tube 5 which deflects intermediate flanges 4, 4', while shoes 10 freely play or float intermediate flanges 4, 4' without normally contacting therewith.

At the same time air tube 5 is entirely protected against punctures and wear, it being enclosed intermediate disks 1, 1' and encircled by shoes 10. Conveniently there is given to the space 16 intermediate disks 1, 1' near the wheel periphery and therefore to air tube 5, a heart-shaped cross section as shown in Figure 1, said tube being reinforced by fabric layers in its outer portion where pressure is operative.

The described wheel while fully complying with requirements as to resiliency, makes the air tube puncture-proof and burst-proof, and therefore its life is long. Further it provides for giving a reduced width to wheel tread while imparting a large size to air tube, thus reducing frictional resistances and wear and tear of road surfaces.

Finally the swaying of the vehicle is prevented in the event the air tube is deflated because the reduction of diameter of the wheel is reduced to a very small amount.

What I claim as my invention and desire to secure by United States Letters Patent is:

1. A resilient vehicle wheel comprising a wheel body providing a peripheral space, radial flanges projecting from the periphery of said body and limiting an outwardly opening channel leading to said space, an air tube in said space, a casing encircling said flanges and engaged therewith, and a row of blocks in said channel between said flanges, each of said blocks bearing on said casing and on said air tube and being free for radial and lateral movements.

2. A resilient vehicle wheel comprising a wheel body providing a peripheral space, radial flanges projecting from the periphery of said body and limiting a restricted channel leading to a central zone of said space, an air tube in said space, a casing encircling said flanges and engaged therewith, and a row of blocks in said channel between said flanges, each of said blocks bearing on said casing and on said tube and being free for radial and lateral movements.

3. A resilient vehicle wheel comprising a wheel body providing a peripheral space, radial flanges projecting from the periphery of said body and limiting a restricted channel leading to a central zone of said space, an air tube in said space, said tube forming a substantially cylindrical surface at the bottom of said channel, a casing encircling said flanges and engaged therewith, and a row of blocks in said channel between said flanges, each of said blocks bearing on said casing and on said tube and being free for radial and lateral movements.

4. A resilient vehicle wheel comprising a wheel body providing a peripheral space, radial flanges projecting from the periphery of said body and limiting an outwardly opening channel leading to said space, an air tube in said space, a flexible band on said tube and between said flanges, a casing encircling said flanges and engaged therewith, a flexible band on the bottom of said casing, a row of blocks in said channel between said flanges, each of said blocks bearing on said two bands and being free for radial and lateral movements, and means engaging said bands and blocks acting to prevent relative movement thereof in a circumferential direction.

5. A resilient vehicle wheel comprising a wheel body providing a peripheral space, radial flanges projecting from the periphery of said body and limiting a restricted channel leading to a central zone of said space, an air tube in said space, said tube forming a substantially cylindrical surface at the bottom of said channel, a flexible band on said tube and between said flanges, a casing encircling said flanges and engaged therewith, a flexible band on the bottom of said casing, a row of blocks in said channel between said flanges, each of said blocks bearing on said two bands and being free for radial and lateral movements, and means engaging said bands and blocks acting to prevent relative movement thereof in a circumferential direction.

In testimony whereof I affix my signature.

MARIO PONGILUPPI.